US009052005B2

(12) United States Patent
Cross et al.

(10) Patent No.: US 9,052,005 B2
(45) Date of Patent: Jun. 9, 2015

(54) METHOD OF BACKLASH COMPENSATION

(71) Applicant: Deere & Company, Moline, IL (US)

(72) Inventors: Patrick W. Cross, Cary, NC (US); Matthew L. Spencer, Davenport, IA (US); Byron K. Miller, Waterloo, IA (US); Jeffrey D. Dawson, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 184 days.

(21) Appl. No.: 13/916,226

(22) Filed: Jun. 12, 2013

(65) Prior Publication Data
US 2014/0366667 A1   Dec. 18, 2014

(51) Int. Cl.
*H02P 6/16*     (2006.01)
*F16H 57/00*   (2012.01)

(52) U.S. Cl.
CPC ........... *F16H 57/00* (2013.01); *Y10T 74/19623* (2015.01)

(58) Field of Classification Search
CPC ............... G05B 19/404; G05B 2219/41085; G05B 2219/42298; G05B 2219/41053; G05B 2219/41078; F16H 57/00; H02P 6/06
USPC .............................................. 318/630, 400.07
See application file for complete search history.

(56) References Cited

U.S. PATENT DOCUMENTS

| | | | |
|---|---|---|---|
| 6,371,459 B1 | 4/2002 | Schick et al. | |
| 6,597,141 B1 | 7/2003 | Wilson-Jones et al. | |
| 6,886,650 B2 | 5/2005 | Bremner | |
| 8,265,779 B2* | 9/2012 | Hagglund | 700/45 |
| 2011/0290978 A1 | 12/2011 | Keen | |

* cited by examiner

*Primary Examiner* — Karen Masih

(57) ABSTRACT

A control method is provided for an electric motor which drives an apparatus through a gear unit. The method includes generating a gear output and input speed signals, low pass filtering the gear speed signals and subtracting the filtered gear input speed signal from the filtered gear output speed signal to provide a relative speed signal. The method also includes high pass filtering the relative speed signal, multiplying the filtered relative speed signal by damping gain value to generate a backlash compensation torque value, and subtracting the backlash compensation torque value from an apparatus control torque value to generate the desired motor torque value.

9 Claims, 3 Drawing Sheets

METHOD OF BACKLASH COMPENSATION

FIELD OF THE INVENTION

The present disclosure relates to a method of backlash compensation in a gear driven apparatus.

BACKGROUND OF THE INVENTION

A part or an apparatus may be driven by an electric motor which is connected to the part by a gear unit. In such a system, the driving of the part can be adversely effected by backlash in the gear unit. In certain scenarios, such a system can become unstable due to discontinuous load changes caused by backlash. For example, US Application No. 2011/0290978, published 1 Dec. 2011, describes a suspension system wherein an electric motor drives a gear reduction unit, and the gear reduction unit drives a seat base through a scissors suspension mechanism. One scissors link of the scissors mechanism is connected to the motor housing and the other scissors link is connected to an output of the gear reduction unit. An electronic control unit controls the motor as a function of sensed seat position, sensed motor position and operator inputs. When an apparatus is driven by a gear unit, it is desired to compensate for such backlash and to improve system stability.

SUMMARY

According to an aspect of the present disclosure, a part is driven by a gear unit which is driven by an electric motor. The electric motor is controlled by a motor controller as a function of a desired motor torque value. A method of controlling the electric motor includes generating a gear output speed signal, generating a gear input speed signal, filtering the gear output speed signal to provide a filtered gear output speed signal, and filtering the gear input speed signal to provide a filtered gear input speed signal. The method also includes subtracting the filtered gear input speed signal from the filtered gear output speed signal to provide a relative speed signal, and filtering the relative speed signal to provide a filtered relative speed signal. The method also includes multiplying the filtered relative speed signal by damping gain value to generate a backlash compensation torque value, and modifying an apparatus control torque value with the backlash compensation torque value from to generate the desired motor torque value.

DETAILED DESCRIPTION OF THE DRAWINGS

Figure 1:
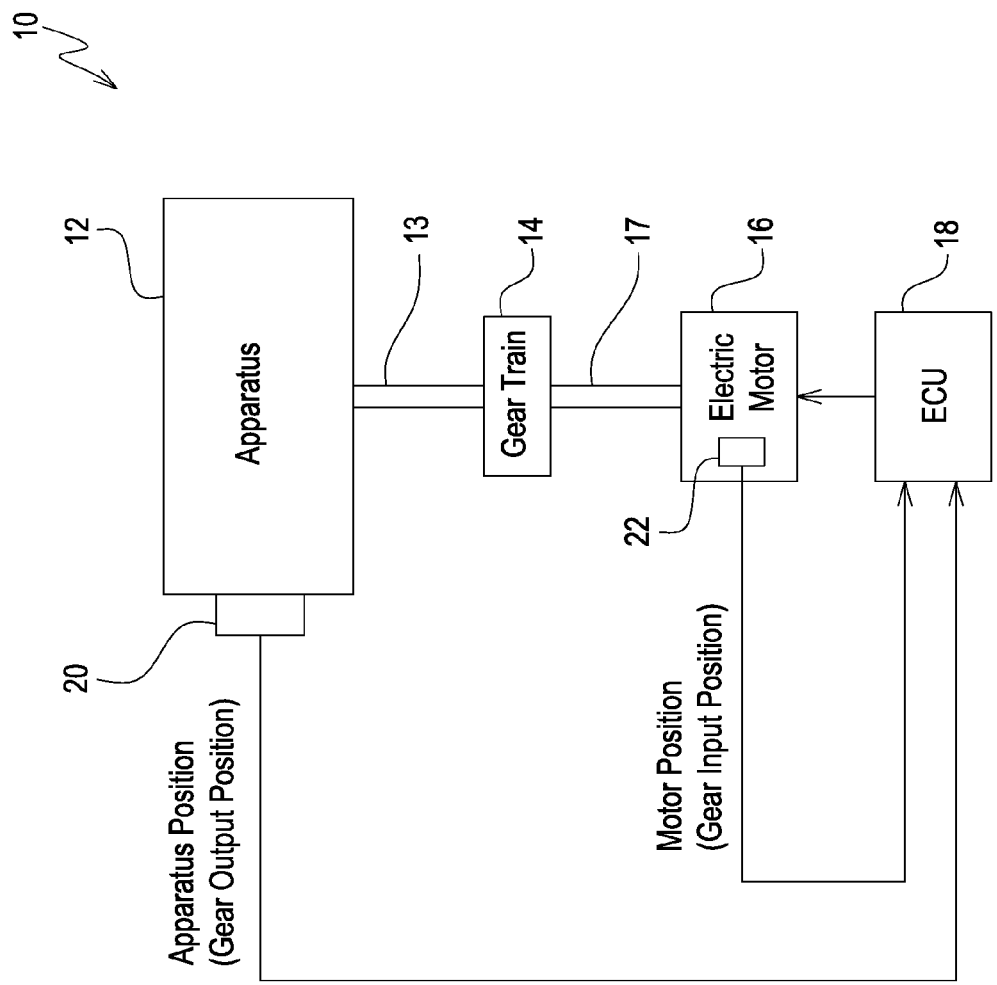
FIG. 1 is a simplified schematic diagram of a control system for a gear driven system embodying the invention.

Referring to FIG. 1, a control system 10 performs a method of controlling the position and movement of an apparatus or part 12. The apparatus 12 is connected to the output 13 of a gear reduction unit 14 which is driven by an electric motor 16 which is connected to an input 17 of the gear unit 14. The apparatus 12 may be a scissors type seat suspension with a gear reduction unit and an electric motor, such as is described in US Application No. 2011/0290978 published on 1 Dec. 2011, which is incorporated by reference herein. The motor 16 may be a permanent magnet brushless DC motor, but other types of electric motors could also be used. The motor 16 is controlled by an electronic control unit (ECU) 18. The ECU 18 receives an apparatus or seat position signal from an apparatus position sensor 20 and a motor position signal from a motor position sensor or incremental encoder sensor 22 which is a built-in feature of the motor 16.

Figure 2:
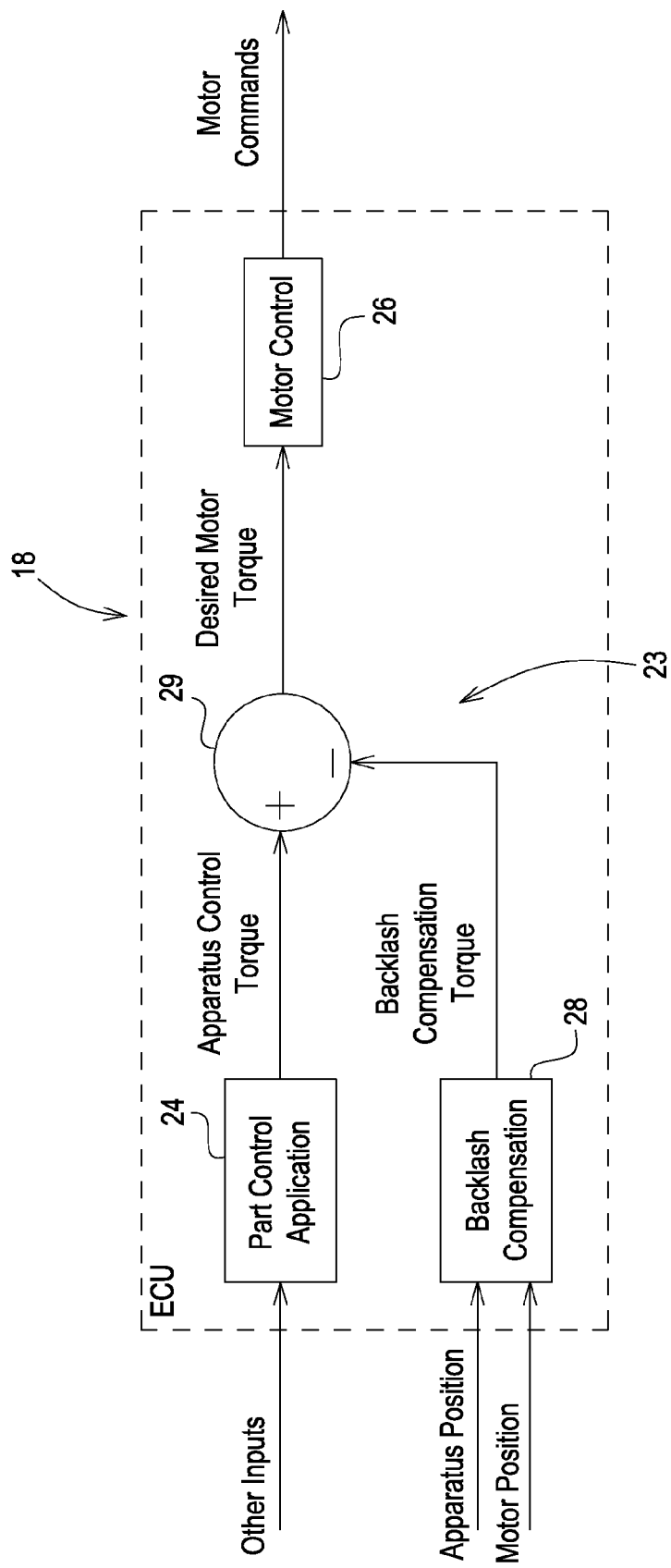
FIG. 2 is a high level control system diagram of the control system which controls the motor of FIG. 1.

The ECU 18 is programmed to implement a control system 23 as shown in FIG. 2. The control system 23 includes an apparatus control 24 which generates, in a known manner, an apparatus control torque signal as a function of various inputs, such as seat position and seat acceleration. A motor control 26 generates a motor command as a function of a desired motor torque signal in a known manner. According to the present invention, a backlash compensation control 28 generates a backlash compensation torque signal as a function of the apparatus position signal and the motor position signal. The desired motor torque signal is generated by a subtraction node 29 which subtracts the backlash compensation torque signal from the apparatus control torque signal.

Figure 3:
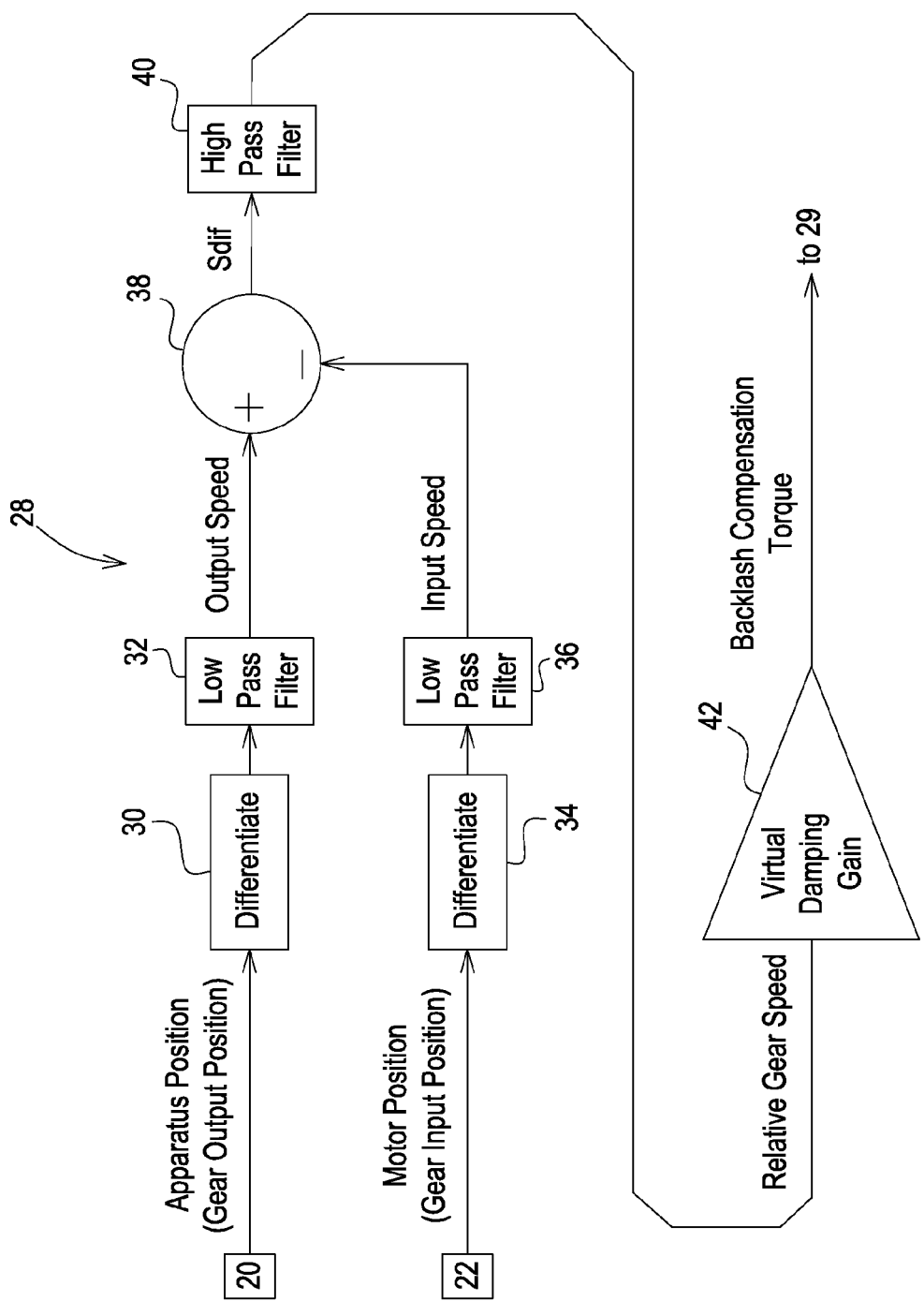
FIG. 3 is a control system diagram which illustrates the backlash compensation method of the present invention.

The ECU 18 is programmed to implement the backlash compensation control system 28 as shown in FIG. 3. The backlash compensation control system 28, includes an apparatus position or gear output position speed or derivative unit 30 which determines an apparatus or gear output speed value from the position signal generated by the apparatus or gear output position sensor 20. The output of unit 30 is filtered by low pass filter unit 32 to provide an apparatus or gear output speed. The filter unit 32 is a first order low pass filter which removes measurement noise that is accentuated in the derivative operation. The backlash compensation control system 28, also includes a motor or gear input position speed unit 34 which determines a motor or gear input speed value from the position signal generated by the motor position sensor 22. Preferably, speed unit 34 is implemented with hardware timers and counters to calculate motor speed based on encoder pulse timing. The output of unit 34 is filtered by low pass filter unit 36 to provide a seat or gear output speed. Filter unit 36 is preferably a first order low pass filter to remove noise.

A subtraction unit 38 subtracts the gear input speed from the apparatus or gear output speed to provide a speed difference value Sdif. The Sdif output of unit 38 is filtered by high pass filter unit 40 to provide a filtered gear speed difference. Filter 40 is preferably a second order high pass filter. Since the apparatus (gear output) and motor (gear input) speeds are filtered at different cutoff frequencies, they have different phase lags. This phase lag difference between two sinusoidal signals shows up as a low frequency sinusoid in the relative speed. The high pass filter 40 removes this content.

A virtual damping gain unit 42 multiplies the filtered gear speed difference by a virtual damping gain value to generate the backlash compensation torque value which is applied to the minus input of subtraction node 29 of FIG. 2.

The result is a control system which uses the relative speed between the motor (gear input) and the apparatus seat (gear output) to detect "spikes" in the relative speed. During engagement of the gears (not shown) of gear unit 14, this relative speed is zero. These "spikes" occur when the gears of gear unit 14 are disengaged and the input is free spinning unloaded in a backlash condition. This relative speed is multiplied by a damping, or penalty, gain. This adds a virtual damping load to the system, therefore stabilizing the overall control loop even in the face of the backlash nonlinearity. Such a system can be used in any application where a mechanical apparatus is driven by a gear unit which is driven by an electric motor.

The control system described above may be implemented in a conventional microprocessor-based electronic control unit using a commercially available Model Based Software Development tool. With such a tool, control algorithms are created, tested and verified in a graphical modeling and simulation tool. Then, by choosing some code generation options, the tool automatically generate C or C++ code. This generated code is then integrated into the low-level code for the overall control system. Such a tool is available from Simulink, which is part of the Mathworks MATLAB toolchain.

To summarize, the control method includes measuring analog apparatus position, performing a filtered derivative of the apparatus position to obtain an apparatus velocity. The method also includes measuring the digital motor position with its incremental encoder sensor, and calculating motor speed based on encoder pulse timing using hardware timers and counters. The motor speed is filtered to remove noise using first order low pass filter. Motor speed is subtracted from apparatus speed to get a raw relative speed. This raw relative speed is filtered using a second order high pass filter to remove a low frequency sinusoid in the relative speed. Then a damping torque is calculated by multiplying this value by a gain.

The result is a backlash compensation system that improves system stability and response for an electric drive system with a gear train. Another result is a high performance closed loop motion control system for an electric drive system with a gear reduction unit which compensates for the backlash non-linearity that causes instability with high control gains. The system uses a motor position sensor 22 and a load or output position sensor 20 to calculate a compensation torque which operates as a virtual relative input/output damper to stabilize the system. The system uses the motor position sensor 22 and the load (output) position sensor 20, with low pass filtering to calculate a relative speed signal, and then applies a relative damping torque that damps out any relative speed between the gears. This prevents step changes in motor load that can lead to instability for high system gains. This relative damping is only active during backlash transitions, so it has no effect on steady state performance. Furthermore, this system can also improve system response/stability for drive trains with compliance (harmonic drives, flexible shafts, etc.) by adding virtual relative damping to the system.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A method of controlling an electric motor connected to an input of a gear unit, the gear unit having an output connected to drive an apparatus, the electric motor being controlled by a motor controller as a function of a desired motor torque value, the method comprising:
   generating a gear output speed signal;
   generating a gear input speed signal;
   low pass filtering the gear output speed signal to provide a filtered gear output speed signal;
   low pass filtering the gear input speed signal to provide a filtered gear input speed signal;
   subtracting the filtered gear input speed signal from the filtered gear output speed signal to provide a relative speed signal;
   high pass filtering the relative speed signal to provide a filtered relative speed signal;
   multiplying the filtered relative speed signal by damping gain value to generate a backlash compensation torque value; and
   subtracting the backlash compensation torque value from an apparatus control torque value to generate the desired motor torque value.

2. The method of claim 1, wherein:
   the gear output speed signal is filtered by first order low pass filter.

3. The method of claim 1, wherein:
   the gear input speed signal is filtered by first order low pass filter.

4. The method of claim 1, wherein:
   the relative speed signal is filtered by a second order high pass filter.

5. A method of controlling an electric motor connected to an input of a gear unit, the gear unit having an output connected to drive an apparatus, the electric motor being controlled by a motor controller as a function of a desired motor torque value, the method comprising:
   generating an apparatus position signal;
   differentiating the apparatus position signal to generate an apparatus speed signal;
   generating a gear input position signal;
   differentiating the gear input position signal to generate a gear input speed signal;
   low pass filtering the gear output speed signal to provide a filtered gear output speed signal;
   low pass filtering the gear input speed signal to provide a filtered gear input speed signal;
   subtracting the filtered gear input speed signal from the filtered gear output speed signal to provide a relative speed signal;
   high pass filtering the relative speed signal to provide a filtered relative speed signal;
   multiplying the filtered relative speed signal by damping gain value to generate a backlash compensation torque value; and
   subtracting the backlash compensation torque value from an apparatus control torque value to generate the desired motor torque value.

6. In a system having a part driven by a gear unit which is driven by an electric motor, the electric motor being controlled by a motor controller as a function of a desired motor torque value, a method of controlling the electric motor comprising:
   generating a gear output speed signal;
   generating a gear input speed signal;
   filtering the gear output speed signal to provide a filtered gear output speed signal;
   filtering the gear input speed signal to provide a filtered gear input speed signal;
   subtracting the filtered gear input speed signal from the filtered gear output speed signal to provide a relative speed signal;
   filtering the relative speed signal to provide a filtered relative speed signal;
   multiplying the filtered relative speed signal by damping gain value to generate a backlash compensation torque value; and modifying an apparatus control torque value with the backlash compensation torque value from to generate the desired motor torque value.

7. The method of claim 6, wherein:
the speed signals are low pass filtered.

8. The method of claim 6, wherein:
relative speed signal is high pass filtered.

9. The method of claim 6, wherein:
the backlash compensation torque value is subtracted from the apparatus control torque value to generate the desired motor torque value.

* * * * *